United States Patent [19]
Romine

[11] Patent Number: 5,289,778
[45] Date of Patent: Mar. 1, 1994

[54] AUTOMATED ELECTRIC TRANSPORTATION SYSTEM

[76] Inventor: Richard A. Romine, 13251 Cherry St., Westminster, Calif. 92683

[21] Appl. No.: 909,215

[22] Filed: Jul. 6, 1992

[51] Int. Cl.$^5$ ............................................. B61B 15/00
[52] U.S. Cl. ...................... 104/130; 104/89; 104/88; 104/124; 104/288; 105/72.2
[58] Field of Search ............... 104/88, 89, 118, 123, 104/124, 288, 287, 295, 296, 299, 300, 301, 91, 94, 96, 127, 130, 304, 262, 264, 307; 105/72.2; 246/2 S

[56] References Cited

U.S. PATENT DOCUMENTS

| | | | |
|---|---|---|---|
| 3,254,608 | 6/1966 | Alden | 104/89 |
| 3,434,432 | 3/1969 | Seifert | 105/168 |
| 3,590,743 | 7/1971 | Larson | 104/89 |
| 3,858,518 | 1/1975 | Nyman | 104/124 |
| 4,791,871 | 12/1988 | Mowll | 104/88 |
| 5,108,052 | 4/1992 | Malewicki et al. | 104/88 |

Primary Examiner—Mark T. Le
Attorney, Agent, or Firm—Albert O. Cota

[57] ABSTRACT

An automated electric transportation system which has an electrically driven vehicle (30) including onboard energy storage (34), combined road wheels (56) and rail wheels (58) along with manual controls (68) for transporting people and objects from one place to another. A network of roads (60) and rails (62) is employed with an electrical power bus (100) positioned adjacent to the rails for electrically powering the vehicle while on the rails. An overhead monolift (196) removes the vehicle from the road using a strut arm (208) with casters (184) that extends above the vehicle and deposits the vehicle on the railroad tracks where it is controlled by an on-board computer (134). Automatic controls and indication (132) including this computer regulate the speed and relationship to other vehicles while on the rail network. Another monolift (196) removes the vehicle from the tracks in a similar manner. Energy consumption is measured and billed to users of the rail network (62) through a master rail network computer (118).

23 Claims, 10 Drawing Sheets

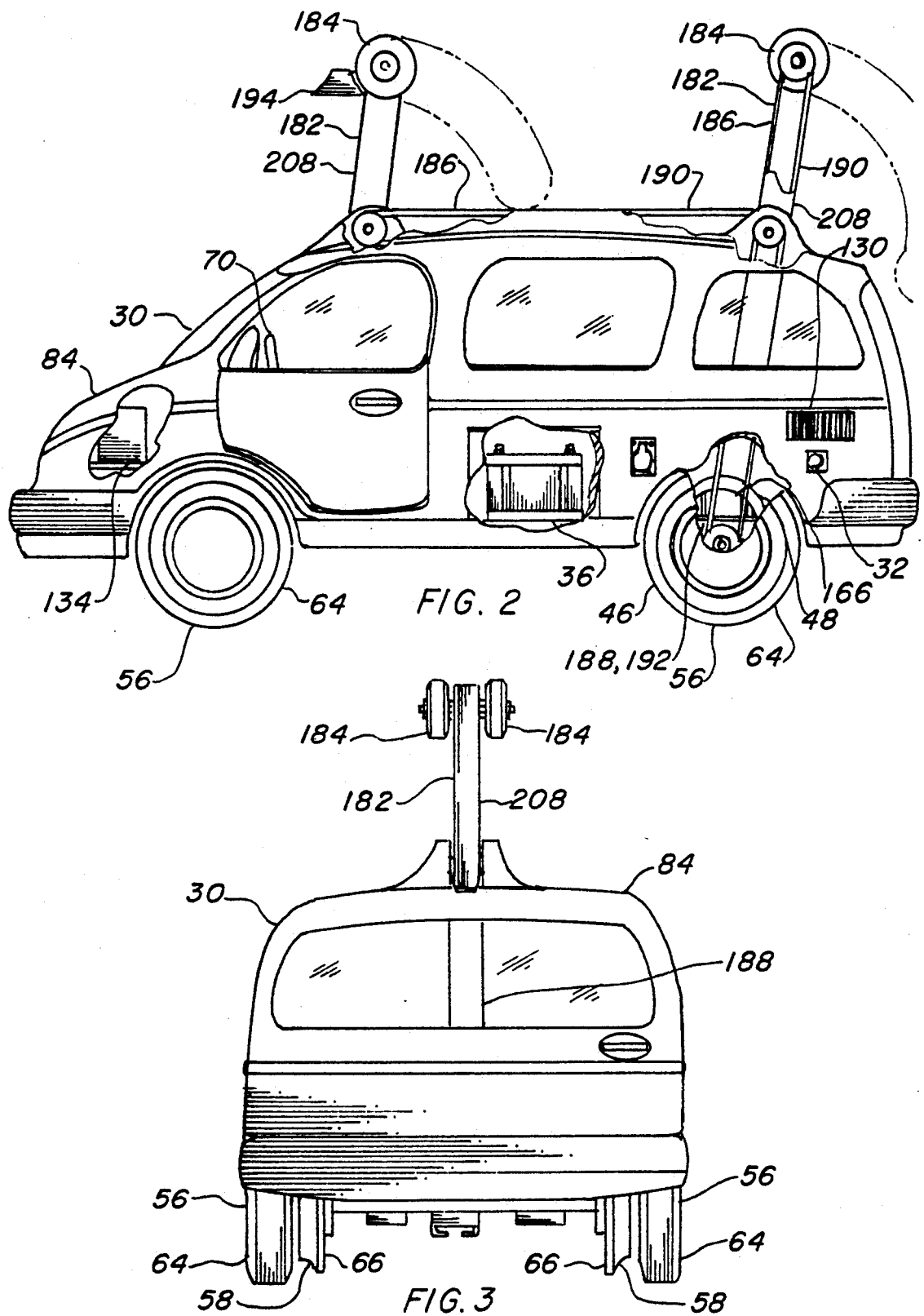

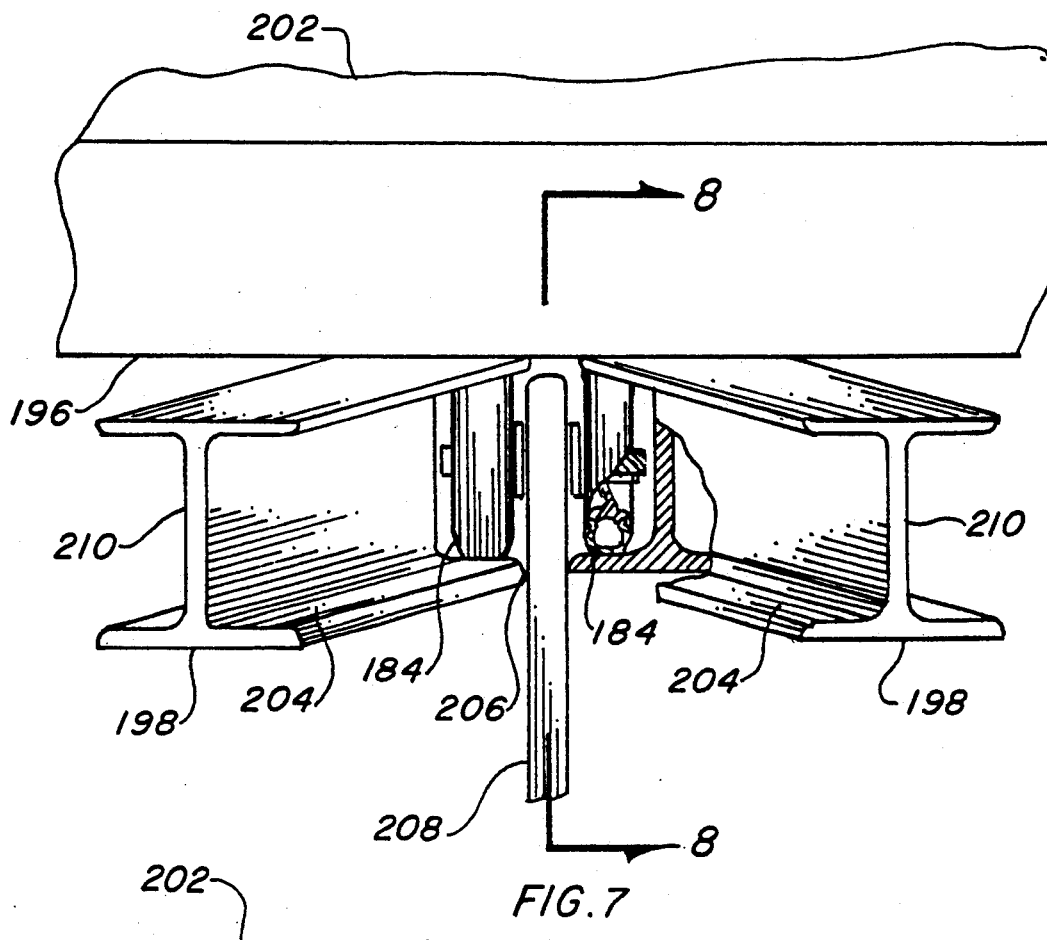
FIG. 7
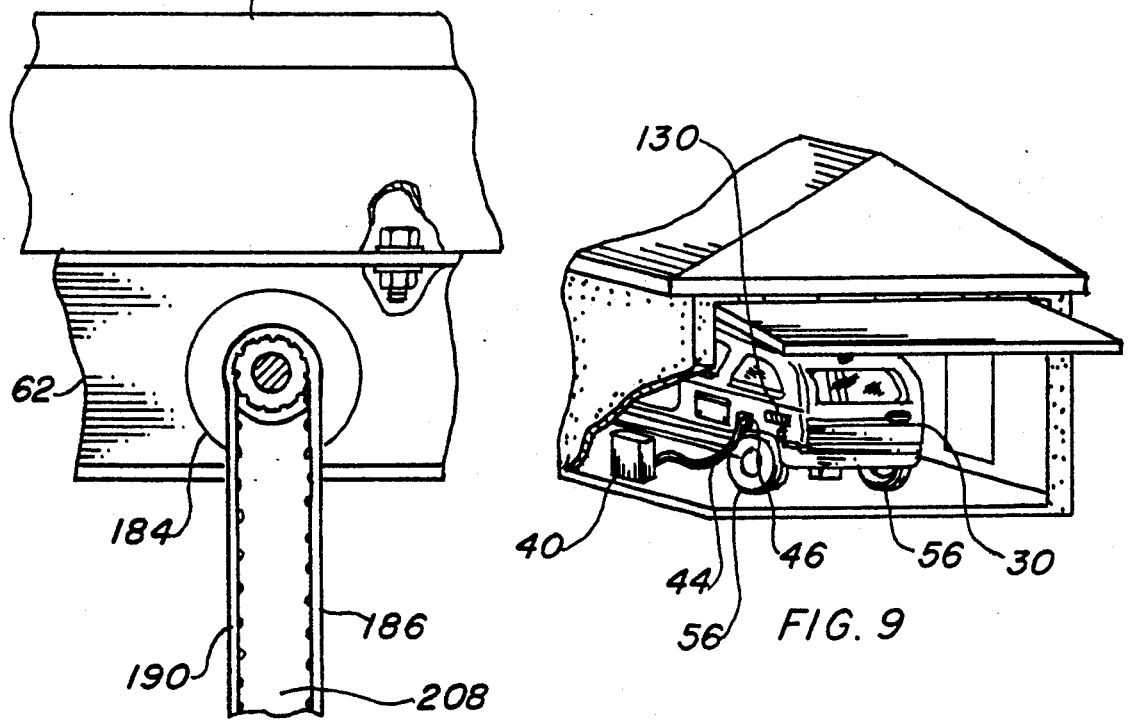
FIG. 8
FIG. 9

AUTOMATED ELECTRIC TRANSPORTATION SYSTEM

TECHNICAL FIELD

The present invention relates to transportation systems in general, and more specifically to automated electrically driven vehicles operating on a combination of roads and rails with electrical energy replenished at appropriate locations.

BACKGROUND ART

Many types of transportation systems have been proposed and used in endeavoring to provide an effective means for producing a method of conveying passengers and items from one place to another. Previously, this type of system has been limited to conveyers, electrified roadways and guidewire systems.

A search of the prior art did not disclose any patents that read directly on the claims of the instant invention, however the following U.S. Patents are considered related:

| U.S. PAT. NO. | INVENTOR | ISSUED |
|---|---|---|
| 4,139,071 | Tackett | 13 February 1979 |
| 4,726,299 | Anderson | 23 February 1988 |
| 4,884,202 | Ogawa, et al | 28 November 1989 |
| 4,902,948 | Sherman, et al | 20 February 1990 |
| 4,952,578 | Tsuneda | 28 August 1990 |

Tackett in U.S. Pat. No. 4,139,071 teaches an electrified roadway having a method of transmitting an electrical current through the road surface to vehicles operated thereupon. The vehicle tires are electrically conductive and through sliding contacts transmit the electrical energy to the propulsion system of the vehicle. Fluid energy supplies the motive power and batteries store the electrical energy obtained from the roadway and also pads while the vehicle is parked.

U.S. patent issued to Anderson, U.S. Pat. No. 4,726,299 discloses a network with a number of stations interconnecting path segments. Branch points connect the segments and are directed in a first or second direction. Coordinates of a destination station are associated with the vehicle and select the appropriate route in the network to ultimately reach the desired location.

Ogawa, et al in U.S. Pat. No. 4,884,202 utilize a driverless vehicle steered by a program in a data recorder. The vehicle plays back the data causing a signal to determine the position of the steering. Any steering position error is adjusted to duplicate and keep the actual steering position substantially similar to the representative signal from the data recorder.

U.S. Pat. No. 4,902,948 of Sherman, et al discloses a guidance system for directing unmanned vehicles along guidewires. Data communication circuits provide an extensive network with a traffic control computer which allocates resources and commands to the vehicles. At varying time intervals, status is received by the computer which temporarily stores messages of other vehicles. Data transmitters utilize cosine waveforms converted into sine waveforms with low or high impedance imposed on the guidewires.

The United States patent issued to Tsuneda U.S. Pat. No. 4,951,574 presents a conveyer system having a rail and automotive cart. The cart is electrically driven obtaining energy from the rail. Signals are transmitted and received through the rail for starting, stopping and travel using a magnetic sensor and electromagnets. Pole plates are positioned along the conveyor rail at appropriate positions for breaking control.

DISCLOSURE OF THE INVENTION

The automated electric transportation system uses a combination of available technologies to provide a transportation system that satisfies present and future personal, public and commercial needs. The invention provides safe, fast and convenient transport of passengers and materials with minimum production of atmospheric pollution.

The system comprises electrically driven vehicles that travel on either existing roads, tracks and/or a monorail. The vehicles are sized to meet specified needs similar to existing peoplemovers, automobiles, buses, trucks, trailers, recreation vehicles, trains, etc. The vehicles are electrically powered through a power bus adjacent to the track and also by on-board storage modules. These modules are normally charged during rail travel assuring the vehicle is capable of operation at its maximum range on existing streets after exiting the network of rails.

The rail network will have station data transmitted to the vehicle which can be interpreted by on-board data accumulation equipment which is fed into an on-board computer for processing. Similarly, a scanner reads vehicle displayed data and forwards the data to a rail station computer network for processing.

A vehicle on-board computer provides the capability of programming and automatically controlling the vehicle at any station on the rail line to any other station or interconnecting line. This control is accomplished by a combination of pattern recognition and automatic switching means to enable the overall system to respond thus assuring that each command has been successfully completed. Audible and visible alarms will indicate that errors have occurred permitting automatic operation to be overridden reverting to manual operator control. Also, alarms will warn the operator to take control upon exiting the rail line and entering existing surface streets.

Entering, exiting and switching within the rail system will be accomplished using an overhead lifting device in order not to impede the flow of traffic. The vehicles will have a mechanism that extends above to catch an overhead monolift having a single boxed structure supported from the ground level. The vehicle will be lifted off the tracks by the monolift and then transferred to an offramp, on a surface street or to a different set of tracks within the interconnecting rail system. Stationary monolift locations will be identified by the vehicle on-board computer and a data accumulation system which will activate the extendable overhead lifting mechanism for transfer to the selected monolift. For ingress, or egress, onto the rail system, the identified vehicle will be accelerated thus providing sufficient momentum for safe transfer without impeding the flow of traffic on the rail system.

The vehicle will use a plug-in storage type electrical power module that can be quickly removed and replaced. In the event of long distance travel off the rail system (further than the maximum range) power module exchanges or quick charges may be provided by roadside power stations (much like gas is provided by today's filling stations).

The vehicle's extendable overhead lifting mechanism for catching the monolift may also interface with a suspension bridge as a substitute for a rail or road bridge where normal construction is impractical.

The vehicle will be equipped with a meter that displays energy consumed from rail power usage so it may be automatically read along with vehicle identification when entering or exiting the rail system. This same information may be provided at any predefined location along the line. This data reading may be automatically processed for billing the user for the appropriate cost of the power consumption. Intermediate predefined readings may be tied to individual utility/power companies at local, state and federal boundaries for billing and tax assessment purposes.

A primary object of the invention is to provide a system of transportation that uses existing surface streets and roads in combination with a new fast moving electrified rail system having methods of entering and exiting at suitable speeds; and that utilizes automatic controls to move traffic at a rapid and yet safe pace.

An important object of the invention is related to ecology where electric vehicles eliminate the majority of the atmospheric pollution produced by gasoline and diesel fueled vehicles.

Another object of the invention is safety as automatic controlled travel on tracks in the same direction provides the safest means of travel available and removes the stress or distraction contributing to present accidents.

Still another object of the invention is directed to convenience where the automated electric transportation system overcomes the main objections to current public transportation—getting to and from pick up locations and waiting for connections and transfers. The invention integrates an individually owned vehicle into the mass transportation system while still permitting the independence of travel at one's own convenience. The availability of power on the main rail system provides the capability to have airconditioning and other amenities without sacrificing the range of the electrically powered vehicle.

Yet another object of the invention provides a relaxing mode of transportation through any traffic conditions and will deliver to the job a more productive, work-ready employee.

A further object of the invention is economy where dedication to the automated electric transportation system would require expenditures of private and federal funds to design, develop and build electrical automobiles, high speed electrified rail systems, power stations and support equipment. Short and long term jobs would be created at all levels in every state or country that would adopt the system. Even though the system may be built using today's technologies, it is flexible enough to use advances in any involved field as soon as they occur.

The system may be phased into operation over a number of years without abruptly affecting current manufacturers and usage of existing transportation systems. The automobile, utility and construction companies would have time to develop and prepare their products in a competitive environment. The aerospace industry could apply its advanced technology to support the design and development of some parts of the system.

The system would eliminate much of the need for highway patrols on rail travel routes. Insurance rates would decrease based on safer, more accident free travel with fewer personal injuries. Medical costs would be reduced as well as time lost from the job as a result of accidents.

A final object of the invention relates to revenue where a direct billing system could provide an equitable means for taxing users and provide revenue at the city, country, state and federal level according to usage. Taxes are obviously necessary to provide the funds for the construction and maintenance costs of the system. Value added taxes based on vehicle type, weight and maintainability requirement factor may be added based on vehicle identification and registration.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 is an elevation view of the electrically driven vehicle cut away to illustrate internal elements and features.

FIG. 3 is a rear view of the electrically driven vehicle.

FIG. 7 is a cross sectional view taken along lines 7—7 of FIG. 10 illustrating the monolift single boxed structure.

FIG. 8 is a cross sectional view taken along lines 8—8 of FIG. 7 illustrating the monolift single boxed structure and the drive system from the vehicle.

FIG. 9 is a partial isometric view of the vehicle attached to residence facility power.

BEST MODE FOR CARRYING OUT THE INVENTION

The preferred embodiment of the automated electric transportation system is shown in FIGS. 1 through 21. The system is comprised of a number of interrelated apparatus and networks some of which are already in existence and may be used with some alteration and others which are already within the state of the art but not combined into one operable system.

A vehicle 30 is the heart of the invention which is self propelled and driven by an electric propulsion motor 32. A typical vehicle 30, is illustrated in FIGS. 2-6 however, it may be any style or type varying from a small people mover to as large as an electrically operated train. This vehicle 30 would also include passenger automobiles, buses, trucks, trailers and recreational vehicles of varied sizes and configurations as the invention would work equally well transporting people, objects, goods and freight along with the driver.

Figure 20:
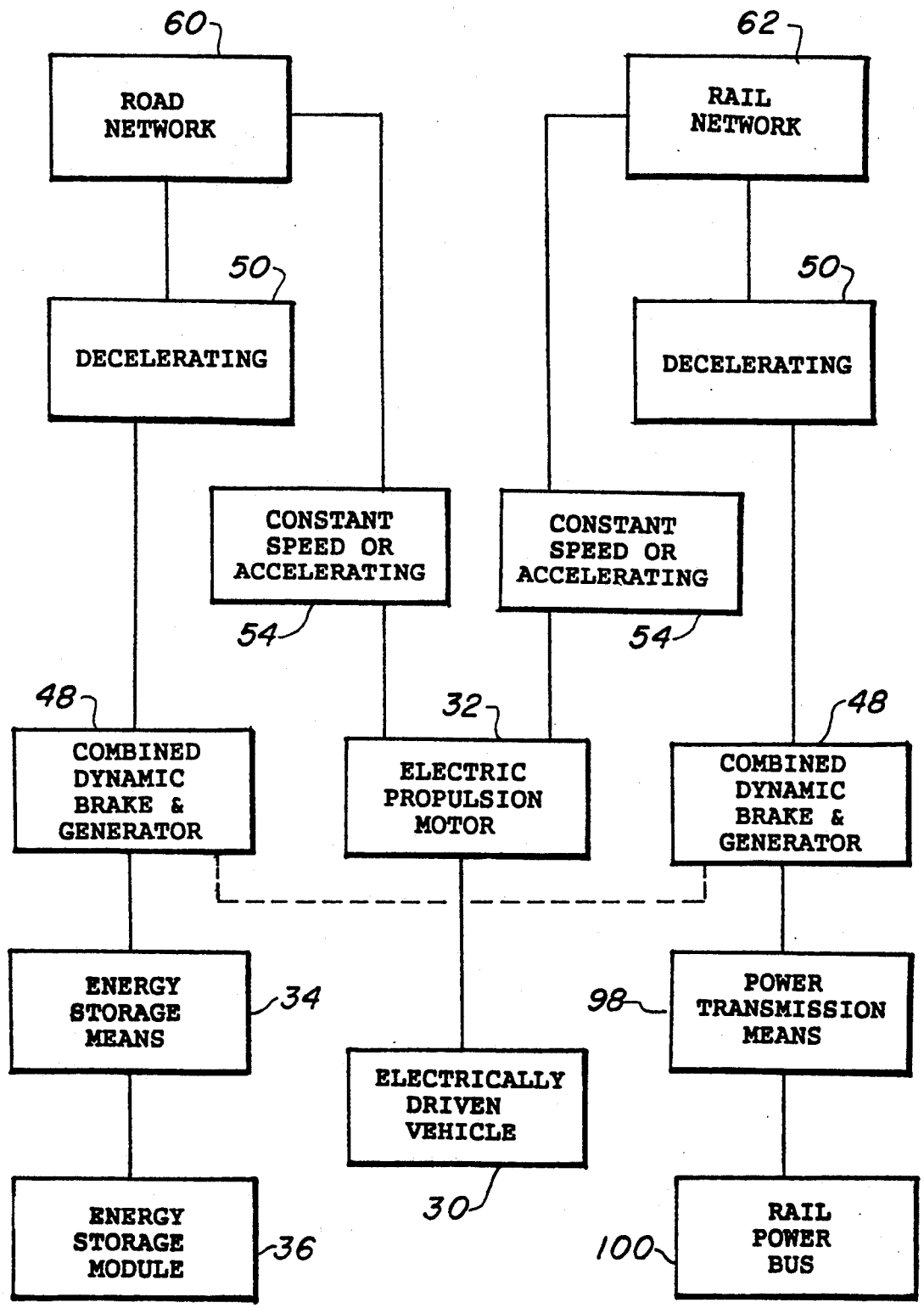
FIG. 20 is a block diagram of the electric propulsion motor and its combined dynamic brake and power generator.

As shown in FIG. 20, the electric propulsion motor 32 includes a combined dynamic brake and generator 48 integral therewith. This combination 48 permits the motor 32 to utilize the reverse torque from the wheels created by the inertial energy of the vehicle to rotate the motor electrically reversing its function from a motor to a generator. Optionally simple dynamic braking may be utilized by reversing polarity of a number of poles creating a magnetic flux which permeates the gap and the iron of the rim causing eddy currents that repulse the rotation of the rotor. When the motor 32 is functioning in the generator 48 mode, the electrical power produced while decelerating 50 may flow into power transmission and replenishing means 98 or recharge energy storage means 34 which is in the form of an energy cell or module. When the vehicle 30 is at a constant speed or accelerating 54, the motor 32 functions normally, rotatably driving the vehicle wheels.

In order for the vehicle 30 to be self propelled using electrical power, onboard the electrical energy storage means 34 is positioned within the vehicle thus providing the electrical energy when unavailable from a fixed source. This storage means preferably consists of a quick replaceable, electric energy storage module 36, having connecting means, to enable the module to be charged from an external source. The module 36 may be any type suitable for the application such as the well known lead, lead-acid, nickel-iron-alkaline and nickel-cadmium-alkali battery or any other type common within the art. It should be noted that much effort has been expended recently to improve electrically driven vehicles to a state of practicality and this invention includes these developments with the addition of the interrelated elements and functional capabilities thus defined. For example, the isotopic power unit described in U.S. Pat. No. 5,082,505 uses a combination of tritium and a photovoltaic cell to produce power and has a half-life of 12.4 years.

Figure 4:
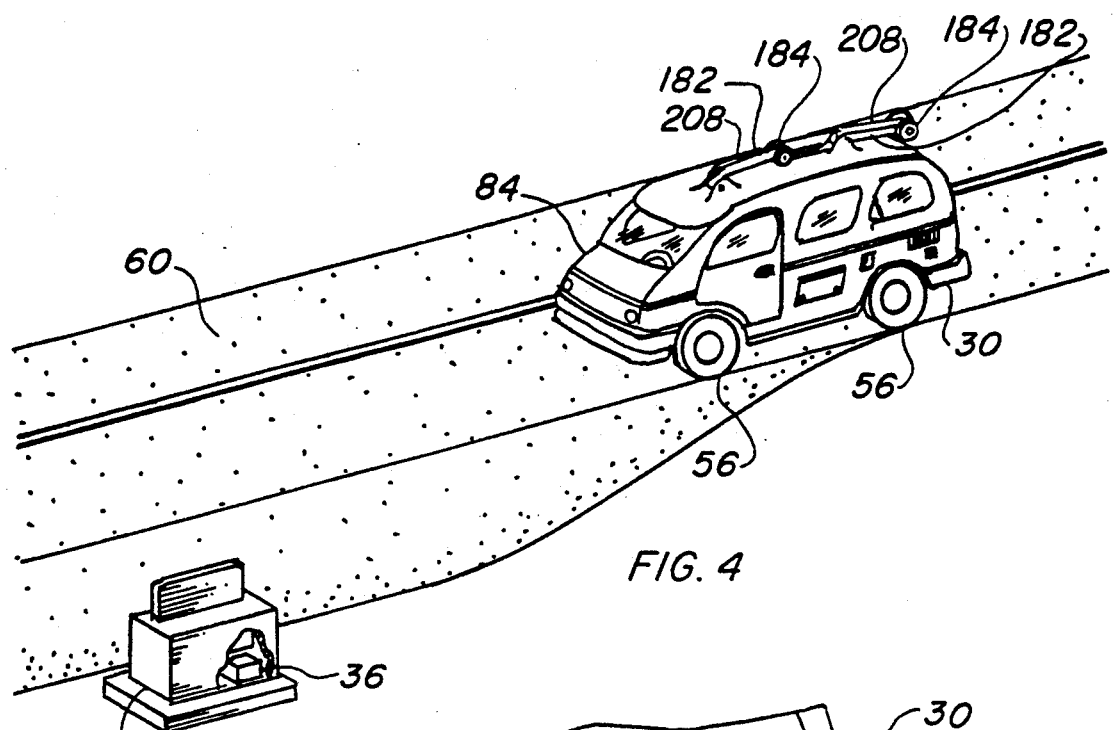
FIG. 4 is a partial isometric view of the electrically driven vehicle on a road with exchangeable energy modules at the roadside.
Figure 5:
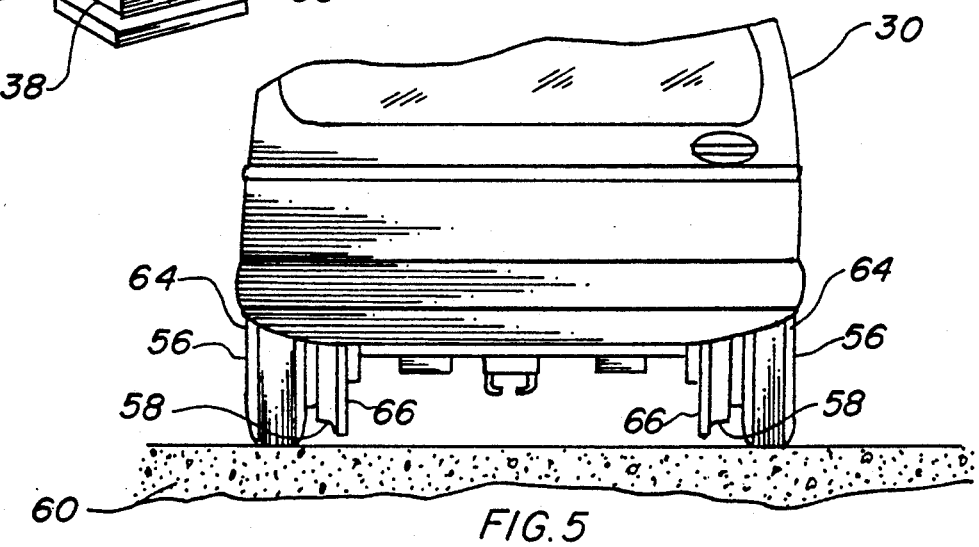
FIG. 5 is a rear view of the electrically driven vehicle with road wheels employed.

The electrical energy storage module 36 may be quickly exchanged when the vehicle 30 is travelling on a road at a roadside power station 38 as illustrated in FIG. 4, or charged when the vehicle is parked overnight and connected to a residence power facility 40, shown in FIG. 9. In any event, the module 36 is charged by power replenishing means 42 which includes but is not limited to the above as other well known methods may be used with equal ease.

If the recharging of the energy storage module 36 is accomplished at a residence power facility 40, a portable cord 44 with a plug is connected to a receptacle 46 on the vehicle 30 providing operator convenience. The power replenishing means 42 is also well known in the art, i.e., a battery charger or the like that is connected to household or utility power and rectifies the facility alternating current to direct current and controls the output. Other methods of electrically recharging the energy module may be used with equal ease.

The vehicle 30 is equipped with combined road wheels 56 and rail wheels 58 for supporting and driving the vehicle on either a road network 60 or a rail network 62. The road wheels 56 are preferably pneumatic tires 64 located on the outside surface of the combination and the rail wheels 58 are specifically metallic railroad wheels 66 positioned on the inside unitedly attached to a common axle. These wheels 56 and 58 are illustrated in FIGS. 2-6 and are also well known in the art.

The road network 60 utilized by the system is in actuality the present roads already constructed which are relatively smooth and render continuous support to the vehicle 30 when driven on the road wheels 56. This includes any roads having a surface that will allow a vehicle to travel thereupon from existing freeways to country lanes since this country has developed a network throughout all of the states.

Figure 15:
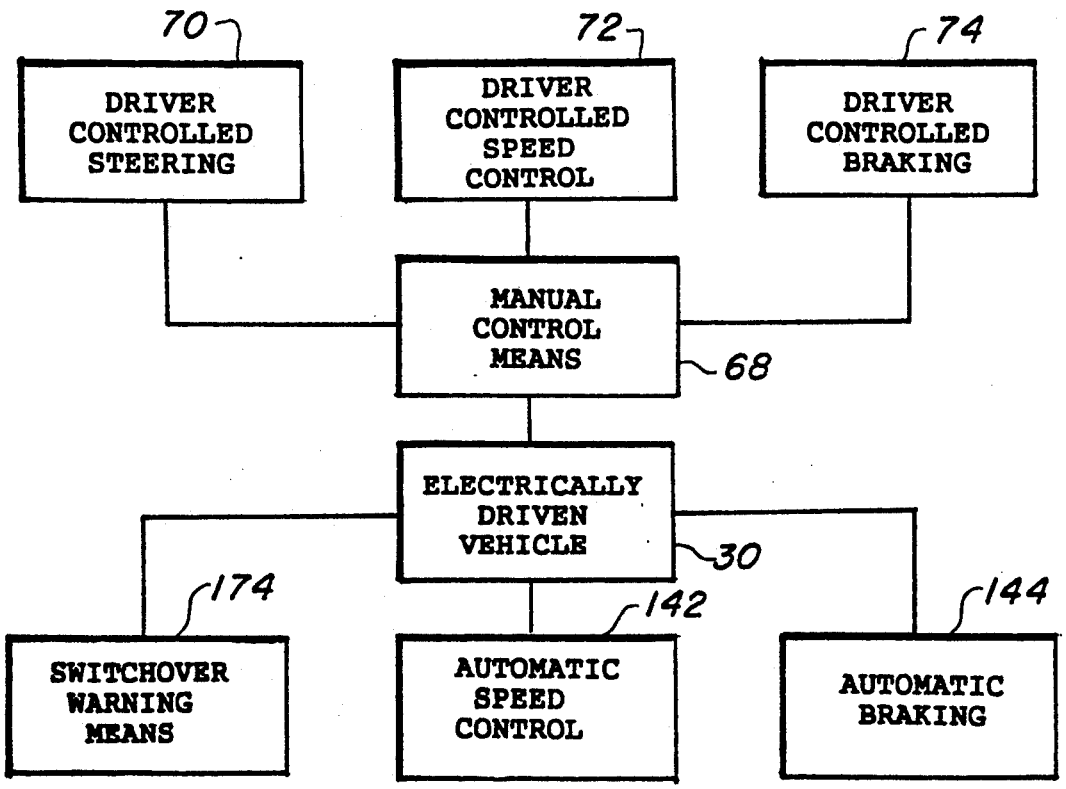
FIG. 15 is a block diagram of the electrically driven vehicle controls.
Figure 16:
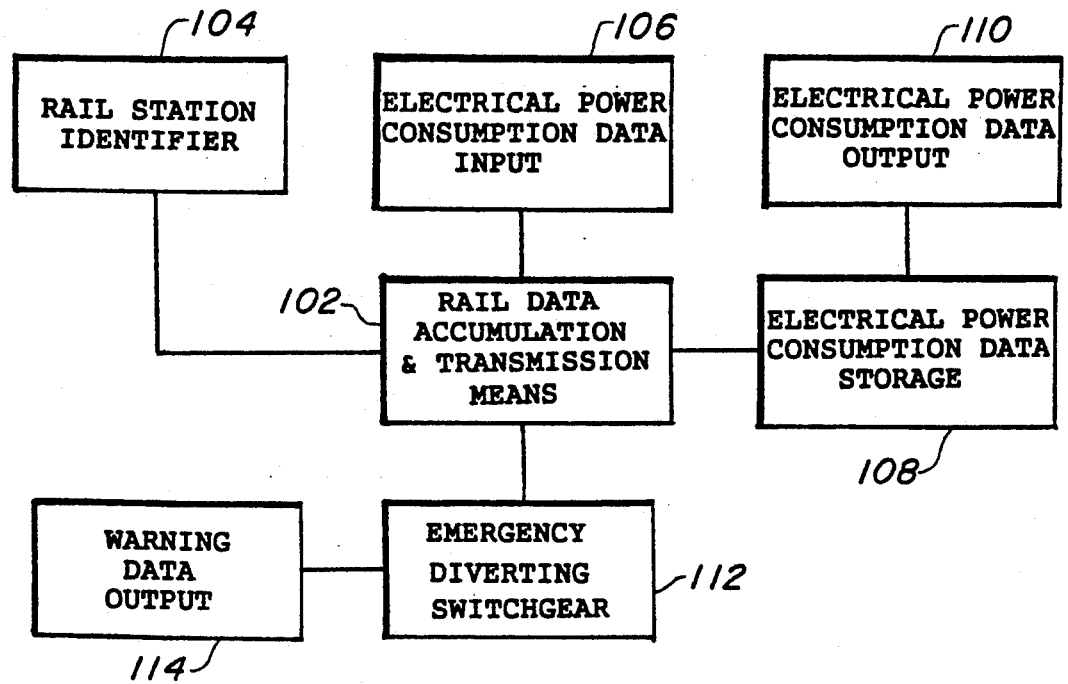
FIG. 16 is a block diagram of the rail data accumulation and transmission means.

The vehicle 30 as shown in FIG. 15, is guided over these roads by manual control means 68 permitting regulation of direction and propulsion namely, driver controlled steering 70, driver controlled speed control 72 and driver controlled braking 74 all of which are now in use in internal combustion engine driven vehicles and present electric driven vehicles.

Figure 6:
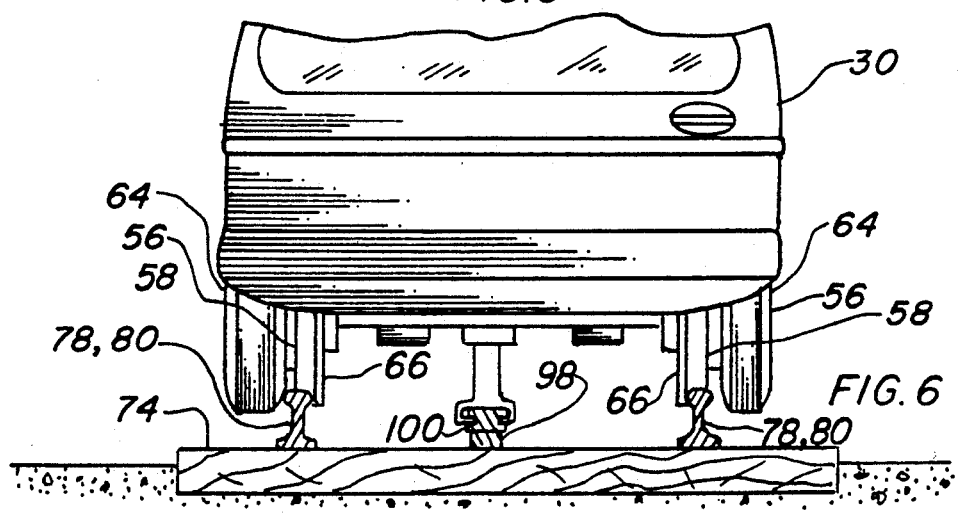
FIG. 6 is a rear view of the electrically driven vehicle with rail wheels employed.
Figure 10:
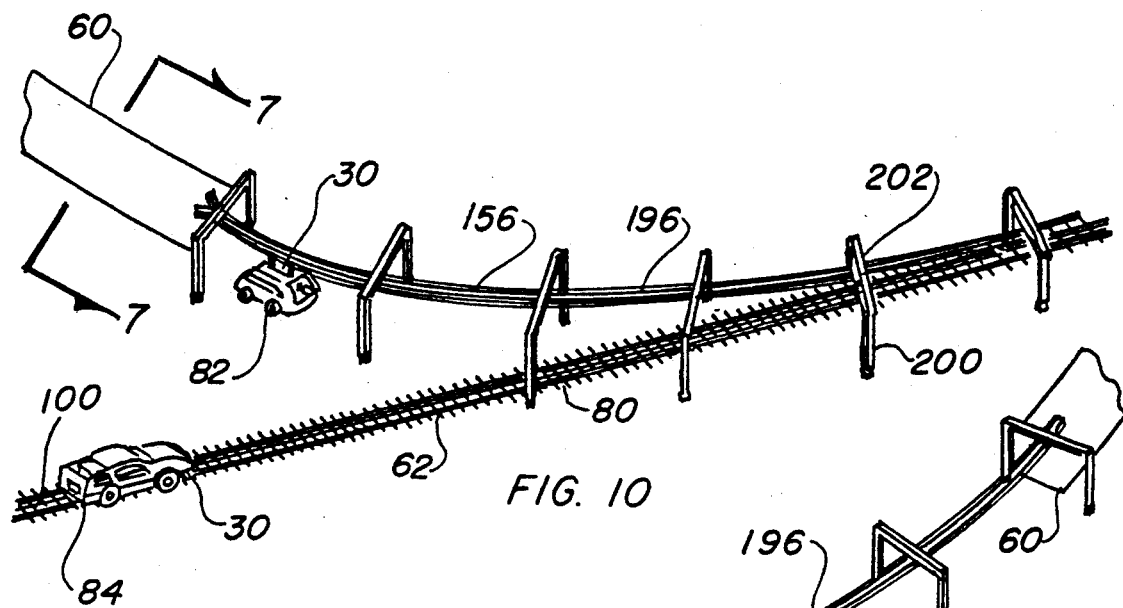
FIG. 10 is a partial isometric view of the rail network with ingress means to enter the network.
Figure 11:
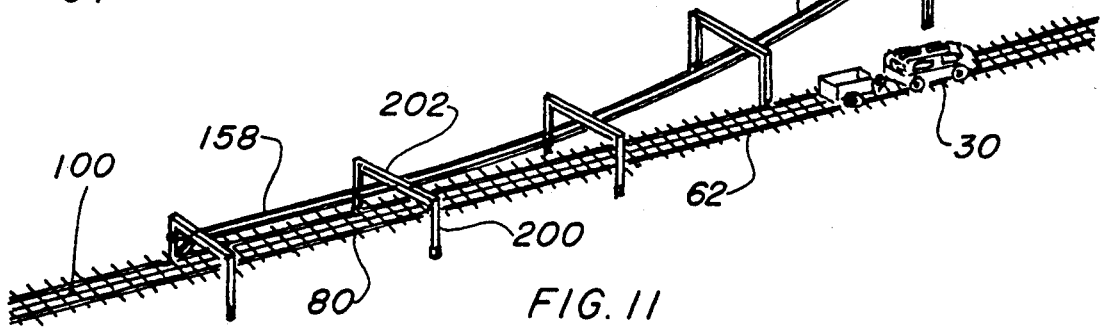
FIG. 11 is a partial isometric view of the rail network with egress means to exit the network.
Figure 12:
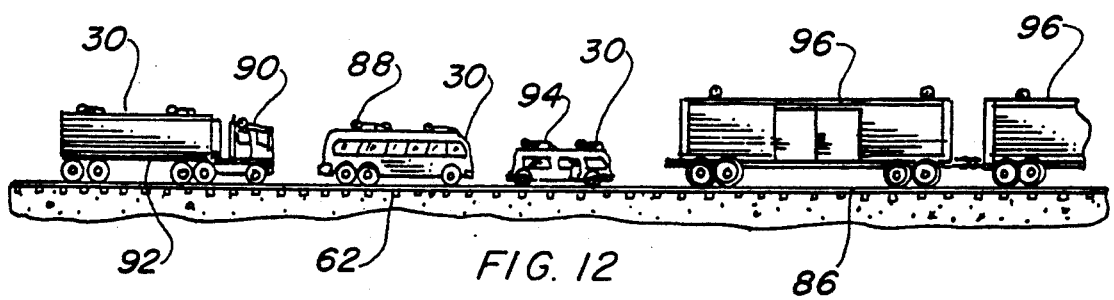
FIG. 12 is a side elevation view of the heavy rail network including appropriate vehicles.

As previously described, the system as shown in FIG. 6, utilizes a rail network 62 which is similar to many railroad tracks in present use and is laid on a railroad bed 76 utilizing railroad tracks 78 to support and guide the vehicle riding on the rail wheels 58. As the height of the vehicle 30 is relevant to the system, light rail tracks 80 as shown in FIG. 11, are used for peoplemovers 82 and automobiles 84 and heavy rail tracks 86 as shown in FIG. 12, are employed for buses 88, trucks 90, truck trailers 92, recreation vehicles 94 and trains 96. With modification, some of the railroad tracks presently in use may be employed with this invention, thus reducing the overall cost of initial installation which could be enormous if all new tracks were necessary throughout the entire system.

While using this rail network 62, the vehicle 30 may be beyond its limit of power availability from the electrical energy module 36 therefore to continue the practical range of the vehicle, the rail network includes rail power transmission and replenishing means 98 consisting of a power transmitting bus 100. This power bus 100, illustrated in FIG. 6, runs parallel to the railroad tracks 78, preferably in the middle, and is positioned such as to permit the vehicle to slideably engage the bus and receive the required electrical energy.

This energy is preferably in the form of direct current electrically, having high voltage potential in order to reduce line size, also the slip surface of the vehicle to the power bus is well known in the art as electric trolley buses use an overhead version and a third rail is not uncommon to transmit power to existing vehicles such as street cars and monorail vehicles. The bus 100 may also receive power from the vehicle 30 when the motor 32 is in the generator 48 mode of operation. The power transmission and replenishing means 98 both furnishes electrical power to operate the vehicle motor 32 and also replenishes the electrical power that has been previously lost from energy cell 36 permitting the cell to be fully charged when leaving the rail network 62.

Figure 21:
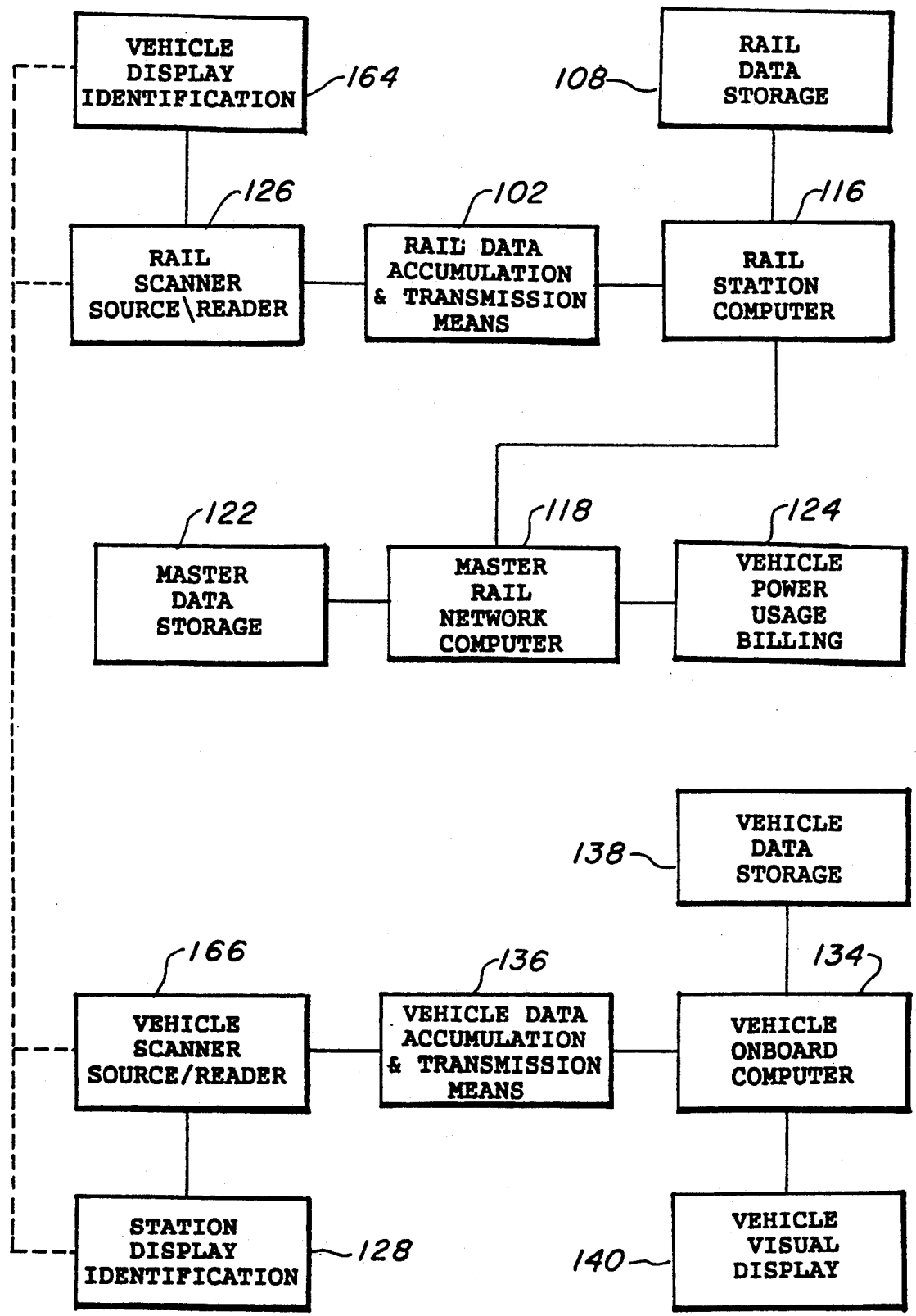
FIG. 21 is a block diagram of both the rail and vehicle data accumulation and transmission means.

The rail network 62 further incorporates rail data accumulation and transmission means 102 which includes rail station identifiers 104, electrical power consumption data input 106, electrical power consumption data storage 108, electrical power consumption data output 110, emergency diverting switch gear 112 and warning data output 114. The relationship of each apparatus and its functional interface is illustrated in the block diagram of FIG. 16. The vehicle 30 monitors its actual power consumption and forwards the data of the energy consumed from rail power transmission means 120 to the nearest rail station as located by the identifier 104. The data input 106 is received as transmitted through the transmission means 102 which may be by radio waves, other methods well known in the art and is forwarded to a rail station computer 116 and is placed in the computer data storage 108 memory. The amount of energy consumed in the rail stations section of track by the vehicle 30 is stored in the computer 116 and the data output 110 is forward to a master rail network computer 118 through a modem using telephone lines or the like. The master computer 118 as shown in FIG. 21 stores the data within a master data storage 122 memory for all of the sections used during a particular time period along with the power input when the vehicle motor 32 is generating power and the difference is calculated. The vehicle power usage billing 124 is then sent to the user of the vehicle 30 for reimbursement of the power consumed.

Other information used by the rail data accumulation and transmission means 102 includes a rail scanner source/reader 126 and station display identification 128. This information source may use a laser reader in the station or an intermediate point and a bar code 130 on the vehicle 30 also an opposed duplicate on the vehicle. With these individual systems, the station and/or vehicle may identify each other for purposes of location or rail usage and licensing etc. This system may also be employed where power usage is handled in another manner such as a toll at one end or the other of a given section of rail or a fixed used fee.

The system further uses automatic control and indicating means 132 integrated into the vehicle 30 for self directing and identifying the vehicle when driving on the rail network 62 basically directed by an onboard computer 134 or microprocessor installed within the vehicle 30. The computer 134 and other ancillary equipment forms vehicle data accumulation and transmission means 136 permitting the vehicle to recognize its relative position on the rail network 62 in relation to its own physical location, proximity to other vehicles, speed, automatic control function, when to leave the rail network, energy consumed from the rail power transmission and replenishing means 98 and to identify the vehicle to the rail data accumulation and transmission means 102.

The onboard computer 134 or microprocessor includes vehicle data storage 138 in the form of memory that is pre-programmed to direct the control of the vehicle. Digital and analog signals are received by the computer 134 through sensors and transducers that individually respond to a given condition. Some of these signals may be immediately read by the driver of the vehicle 30 through a vehicle visual display 140. Output from the computer 134 includes analog signals that provide automatic speed control 142 of the vehicle and automatic braking 144. Vehicle speed 146 is measured by a transducer and a signal is transmitted to the computer 134. Relative position recognition 148 of the vehicle and its proximity to others is accomplished by measuring and inputting the relation to adjacent vehicles 150 and the adjacent vehicle speed 152 which is accomplished by radar tracking well known in the art particularly in the law enforcement discipline. The computer 134 may then not only operate the vehicle at a safe speed, but regulates the speed to correspond to other adjacent vehicles and anticipate their movement while maintaining a safe distance therebetween.

Figure 1:
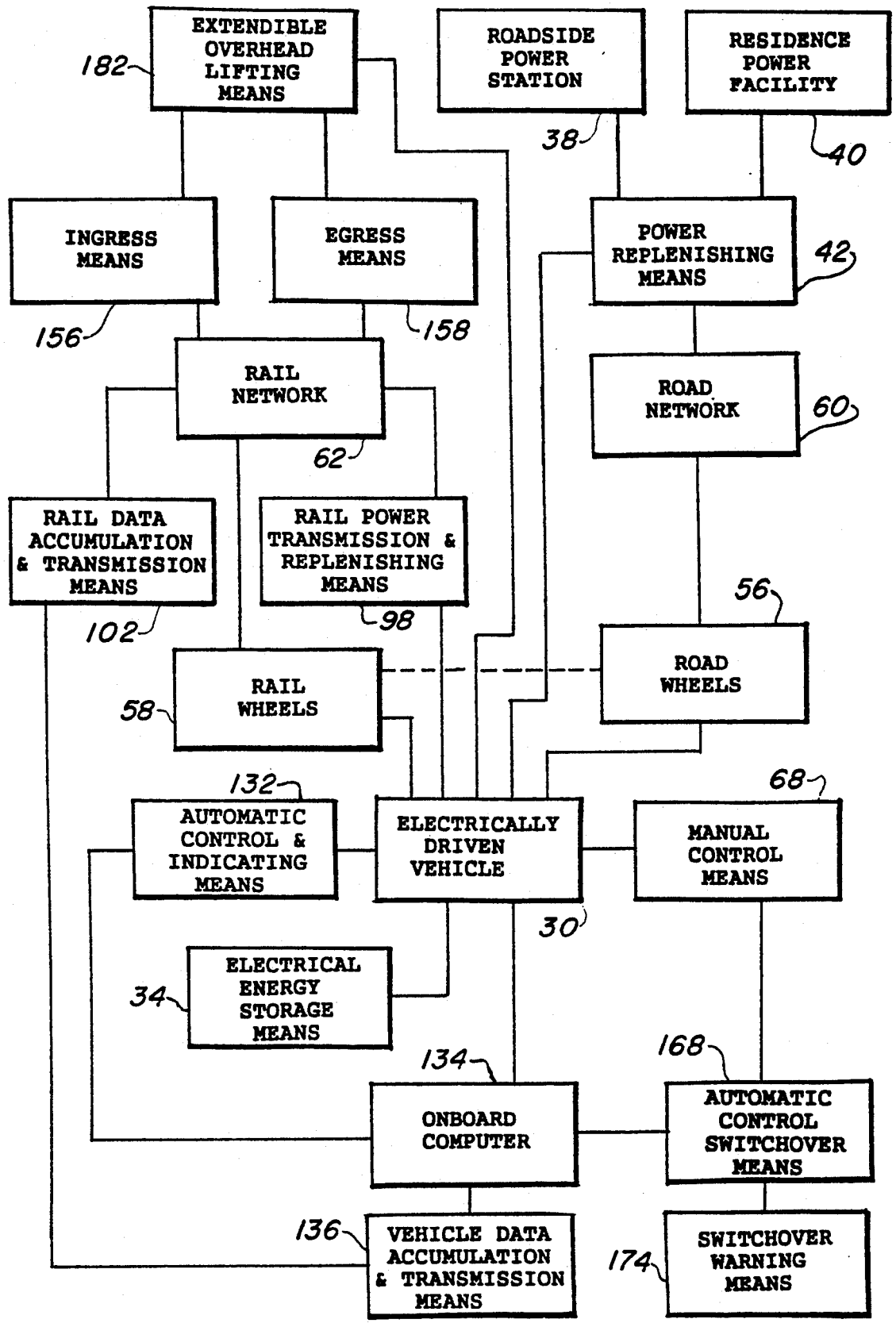
FIG. 1 is a block diagram of the entire automated electric transportation system.

The computer 134 regulates the automatic control means 154 which includes not only the automatic speed control 142 and automatic braking 144 but how and when to enter and leave the rail network 62. When the vehicle 30 enters the rail network 62 in the form of ingress means 156, so designated as many functions and elements are required, or leaves the rail network designated egress means 158, the computer automatically controls all of the functions necessary as illustrated in FIG. 1. A description of the mechnical apparatus necessary for these functions will follow, however, the vehicle operator initiates the procedure for entering the rail network 62 or once on line the automatic control means 154 switches over to ingress means 160 and takes over regulating the speed and braking as necessary, as well as the interrelationship with other vehicles.

The automatic control means 154 may be manually pre-set for the describe destination or station to leave the rail network 62 allowing the operator to relax and be free to move about or pursue other interests in the interim.

Figure 14:
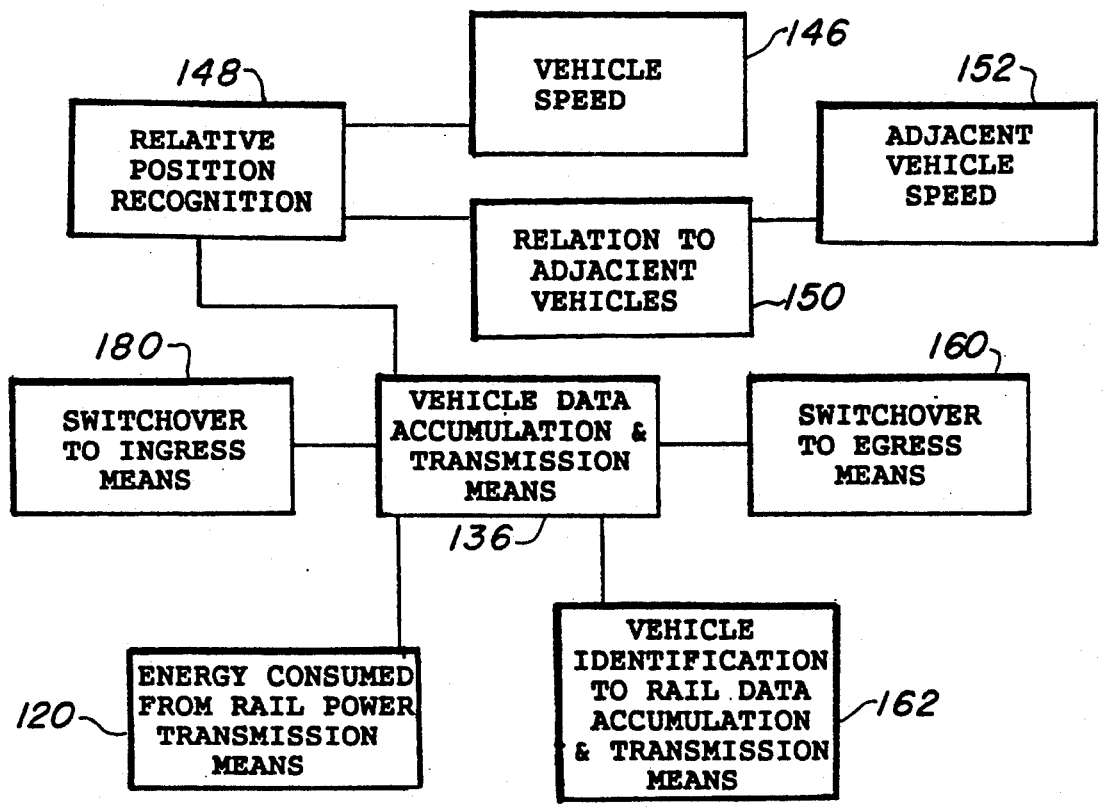
FIG. 14 is a block diagram of the vehicle data accumulation and transmission means.

During this period of time, the vehicle is monitoring its position on the rail network 62 through vehicle identification to rail data accumulation and transmission means 162 as shown in FIG. 14. The vehicle 30 as shown in FIG. 21, includes vehicle display identification 164 basically the same as the station display identification 128 except is is mobile and a vehicle scanner source/reader 166 is also included on the vehicle again the same as the rail scanner source/reader 126 previously described including its purpose and functional operation.

The onboard computer 134 further includes automatic control switchover means 168 permitting conversion of the vehicle 30 from automatic control function 154 through the computer to manual control 68 by the driver. This switchover is initiated by an external signal from the rail network 170 which may be an emergency signal 172 of some impeding danger ahead such as vehicle failure or track obstruction or it may be the normal pre-programmed signal for leaving the rail network i.e., switchover to egress means 160.

Figure 17:
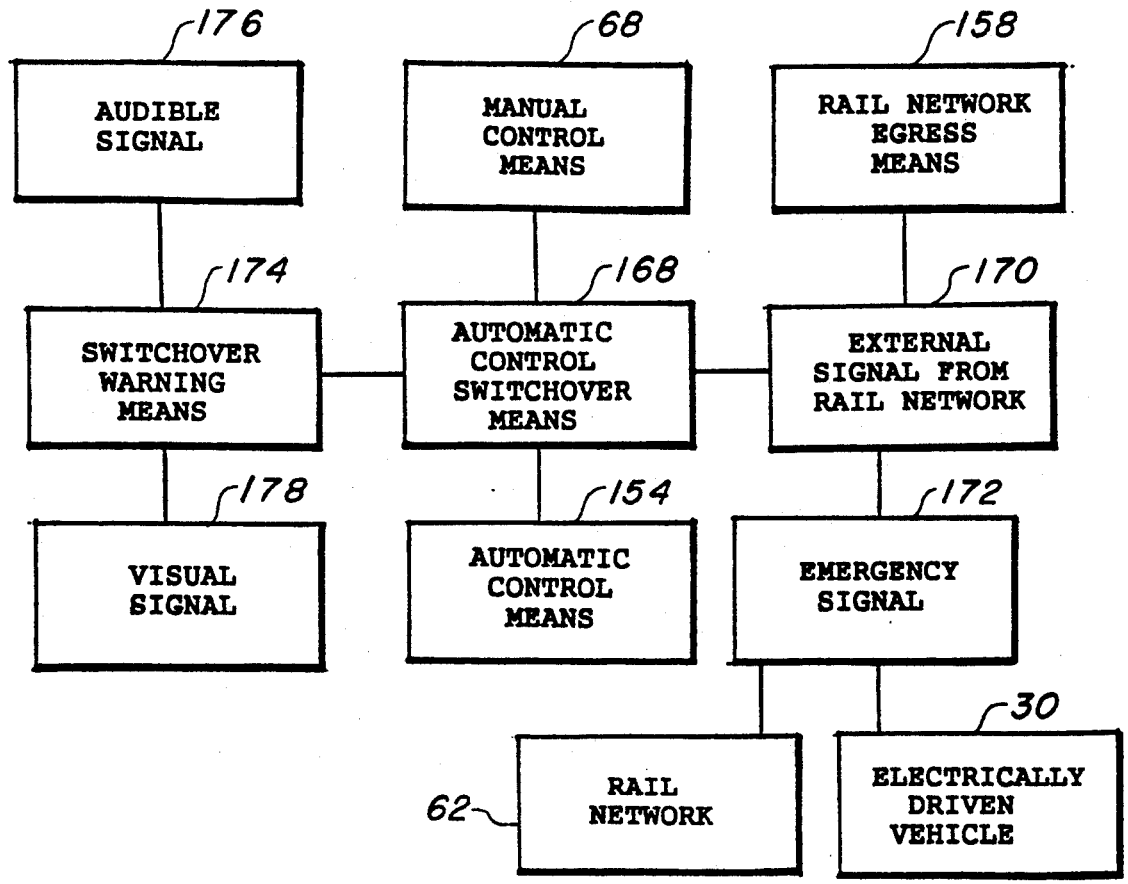
FIG. 17 is a block diagram of the automated control switchover means.
Figure 18:
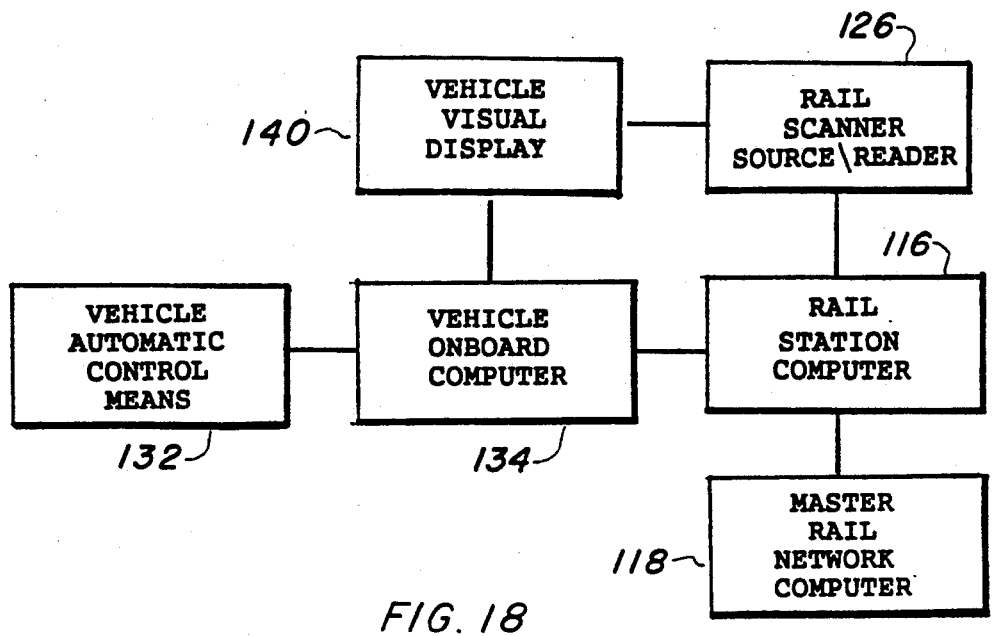
FIG. 18 is a block diagram of the vehicle onboard computer.

In either event, the computer 134 commences switchover warning means 174 preferably using both an audible signal 176 and a visible signal 178 as shown in FIG. 17. This alerts the driver to takeover the manual controls 68 and acknowledging the signal. The vehicle data accumulation and transmission means 136 further includes not only receiving and recording power usage from the rail network 62 but, obviously, switchover to ingress means 180 when the vehicle enters to rail network.

FIGS. 2-3 illustrates extendable overhead lifting means 182 that is part of the vehicle structure that functions to lift the vehicle 30 on and off of the rail network 62. Propulsion means in the form of casters 184 are integrally contained within the lifting means 182 which support the vehicle weight while transferring to and from the rail network 62. The casters 184 shown in FIGS. 2, 3, 7 and 8 are propelled by caster drive means 186 which rotate the casters while operating in the transition between the road network 60 and the rail network 62.

These drive means 186 preferably are embodied in a clutched mechanical drive 188 as illustrated in FIGS. 2 and 8 which incorporate the use of drive belts 190 such as gearbelts, or silent chain in conjunction with an electromechanical clutch 192 as shown in FIG. 2, the drive 188 is taken directly from the axle of the vehicle which is inturn driven by the electric propulsion motor 32. This arrangement permits the entire mechanical energy to be transferred and utilized to continue propelling the vehicle on the overhead mechanism the same as on the rails or roads. In order to interface with the overhead structure at the same speed the vehicle is moving, the clutch 192 is engaged prior to actual interchange rotating the casters 184 at the same relative speed thereby permitting a smooth and gentle transfer action from below to above the vehicle.

Optionally, a separate electric motor may drive the casters 184 during this transitional period. A guard 194 located in front of the casters 184 pushes objects out of the way so as not to impede the movement of the vehicle 30. This guard 194 is illustrated in FIG. 2 and may be any configuration provided it is no larger than the combined casters 184 and has sufficient structural integrally to push objects such as rocks and debris from the overhead system.

Ingress means 156 are located adjacent to and above the road network 60 and rail network 62 permitting the vehicle 30 to enter the rail network 62 using the vehicle overhead lifting means 182 to lift the vehicle from the road and deposit it on the rails. This ingress means 156 consists of an overhead monolift 196 having a parallel flanged structure 198 supported from the ground level with vertical columns 200 on each side of horizontal beams 202. The parallel flanged structure 198, illustrated in FIGS. 7 and 8 has a pair of inner bearing surfaces 204 with a slot 206 in the middle created by the parallel relationship of the flanged structure 198. This structure provides continuous support for the casters 184 and space to receive the vehicle strut arm 208 which is a component of the overhead lifting means 182. The slot 206 has an angular widened initial opening engaging guide 210 which is formed into the parallel flanged structure 198 at the starting point of both the ingress means 156 and egress means 158 as depicted in FIG. 7. This widened area permits the casters 184 to align themselves with the inner bearing surfaces 204 and the slot 206 for a smooth transition and to compensate with misalignment of the strut arm 208 with the monolift 196.

Figure 13:
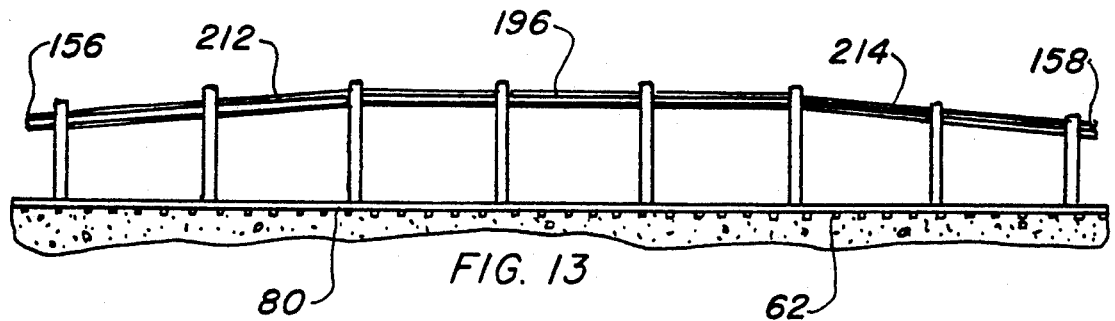
FIG. 13 is a side elevation view of the monolift showing gradual upward and downward slope.

The monolift 196 has a gradual upward slope 212, as shown in FIG. 13, transferring the weight of the vehicle 30 from the road wheels 56 to the casters 184. As previously described, the caster drive means 186 propels the vehicle while on the monolift 196 for delivery to the rails. The monolift 196 is basically level in the middle but includes a gradual downward slope 214 on the end over the rail network 62. This arrangement permits the vehicle 30 to gradually descend until the rail wheels 58 engage the tracks of the rail network 62 in a smooth manner. As both of the casters 184 and rail wheels 58 are rotating while the vehicle is on the monolift 196, the transition is smooth and even. FIG. 13 illustrates this transitional elevation at either end of the monolift.

Egress means 158 shown in FIG. 11 is a direct opposite of the ingress means 156 previously described permitting the vehicle 30 to physically leave the rail network including the overhead monolift 196, boxed structure 198, vertical columns 200, horizontal beams 202, slot 208 etc. The engaging guide 210 is located over the tracks however, permitting the vehicle to enter the monolift 196 from the rails.

Figure 19:
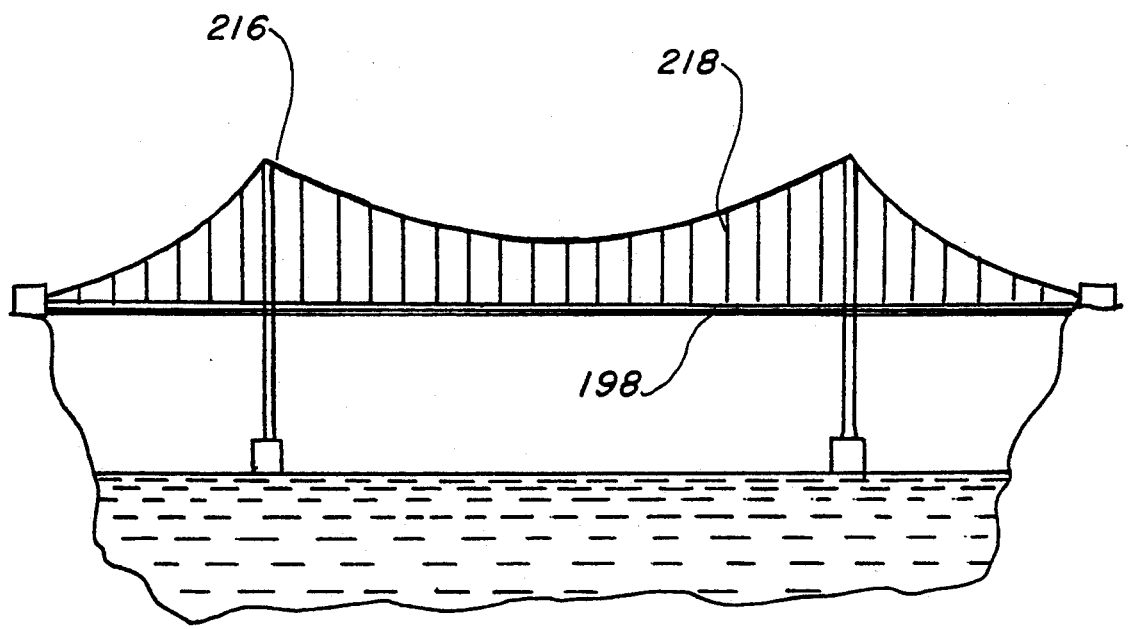
FIG. 19 is a side elevation view of a suspension bridge having ingress means on one end and egress means on the other for spanning a distance where roads or rails are impracticable.

In areas where road and rail networks are impractical due to their initial expense such as across a canyon or body of water a suspension bridge 216 as shown in FIG. 19 may be utilized having all of the same elements as the monolift 196 except the vertical columns 200 and horizontal beams 202 are replaced by suspension means 218 supporting the parallel flange structure 198 from above. As heavy rails or structural roads are replaced with a single parallel flanged structure 198 the supporting structure is minimized thus reducing the overall expense of the bridge 216.

It may be seen that the invention covers a great many disciplines including structure, power transmission, control and data communication etc. all of which are not described in complete detail as the disclosure is for the overall system and each area is within the ability of those skilled in the art. Further, as the system develops into a practical reality more effort will be expended and it is anticipated that the invention will include those developmental details.

While the invention has been described in complete drawings and pictorially shown in the accompanying drawings it is not to be limited to such details, since many changes and modifications may be made in the invention without departing from the spirit and scope thereof. For example, a roadway can be designed to include on its surface, a longitudinal located curved section having a longitudinal center slot. within this slot is located a power bus rail 100 that also functions to guide the vehicle 30 via the rail. This arrangement eliminates the tracks 78 allowing the vehicle 30 to traverse along the mount and rail without the need for rail adapted wheels 66. The curved configuration of the mount would also allow other vehicles to drive over the mount. Hence, it is described to cover any and all modifications and forms which may come within the language and scope of the appended claims.

I claim:

1. An automated electric transportation system comprising, in combination,
    a) a self propelled electrically driven vehicle having an electric propulsion motor, for carrying objects and people therein including a driver,
    b) onboard electrical energy storage means contained within said vehicle to provide electrical energy for propelling and controlling the vehicle when electrical energy is unavailable from a fixed source,
    c) combined road wheels and rail wheels integral with said vehicle for supporting and driving the vehicle on a road and alternatively on rails,
    d) a road network providing a smooth continuous support for the vehicle when driven by said road wheels, e) manual control means incorporated into said vehicle permitting the driver to regulate direction and propulsion of the vehicle, f) a rail network disposed on a railroad bed to support and guide the vehicle riding on said rail wheels, g) rail power transmission and replenishing means incorporated into said rail network for supplying electrical energy to the vehicle while driven thereon and replenishing onboard storage means, h) automatic control and indicating means integrated into said vehicle for self directing and identifying the vehicle while driven on the rail network, i) extendable overhead lifting means integral with said vehicle having propulsion means therein for lifting the vehicle on and off of the rail network and for propelling the vehicle to the road network, j) ingress means adjacent to and above said rail and road network permitting the vehicle to enter the rail network using the overhead lifting means to lift the vehicle from a road and deposit it on the rail network, and k) egress means adjacent to and above said rail and road network permitting the vehicle to leave the rail network using the overhead lifting means by lifting the vehicle from the rail network and deposit it on the road network.

2. The transportation system as specified in claim 1 wherein said electric propulsion motor further comprises a combined dynamic brake and generator integrally integral with said motor having the ability to electrically reduce the speed of the motor.

3. The transportation system as specified in claim 1 wherein said electrical energy storage means further comprises at least one quickly replaceable energy storage module having connecting means to enable the module to be charged from an external source.

4. The transportation system as specified in claim 3 further comprising power replenishing means having a fixed source of electrical energy and a receptacle attachable to said energy storage module connecting means for charging the module in the vehicle.

5. The transportation system as specified in claim 4 wherein said power replenishing means further comprises a roadside power station positioned along said road network permitting said vehicle to exchange the energy storage module as required.

6. The transportation system as specified in claim 4 wherein said power replenishing means further comprises a residence power facility accessible to said vehicle permitting interim and overnight charging of said vehicle energy storage module.

7. The transportation system as specified in claim 1 wherein said combined road wheels and rail wheels further comprise pneumatic tires on an outside surface and metallic rail wheels on an inside surface both attached to a common axle.

8. The transportation system as specified in claim 1 further comprising manual control means including driver controlled steering, speed control and braking of the vehicle.

9. The transportation system as specified in claim 1 wherein said rail network further comprises light rail tracks capable of supporting, people movers and automobiles.

10. The transportation system as specified in claim 1 wherein said rail network further comprises heavy rail tracks capable of supporting, buses, trucks, truck trailers, recreational vehicles and trains.

11. The transportation system as specified in claim 1 wherein said rail power transmission and replenishing means further comprises a power bus parallel with said rail network positioned in such a manner as to permit said vehicle to slideably engage the bus and receive electrical energy therefrom.

12. The transportation system as specified in claim 1 further comprising rail data accumulation and transmission means including rail station identifiers, electrical power consumption data input, storage and output also emergency diverting switch gear and warning data output.

13. The transportation system as specified in claim 12 wherein said automatic control and indicating means further comprises an onboard computer disposed within said vehicle.

14. The transportation system as specified in claim 13 wherein said onboard computer further comprises vehicle data accumulation and transmission means permitting the vehicle to recognize its relative position on the rail network in relation to its physical location, proximity to other vehicles, speed, automatic control, when to switchover to said egress means, and energy consumed from the rail power transmission and replenishing means also to identify the vehicle to the rail data accumulation and transmission means.

15. The transportation system as specified in claim 13 wherein said onboard computer further comprises automatic control switchover means permitting conversion of the vehicle from automatic control function through said computer to manual control by the driver in the event of an emergency and when the vehicle leaves the rail network.

16. The transportation system as specified in claim 15 wherein said automatic control switchover means further comprises switchover warning means audibly and visually alerting the driver that the vehicle is to be converted into manual operation for egress from the rail network and in the event of an emergency or unforeseen occurrence.

17. The transportation system as specified in claim 1 wherein said extendable overhead lifting means further comprises casters integrally contained therewithin for bearing the vehicle weight while transferring to and from the rail network from the road network via the ingress and egress means.

18. The transportation system as specified in claim 17 wherein said extendable overhead lifting means further comprises caster drive means for rotating the casters propelling the vehicle with the casters when supported therewith providing a method of motivation during the transition from the road network to the rail network and vice versa.

19. The transportation system as specified in claim 18 wherein said caster drive means further comprises a clutched mechanical drive connecting said casters to the vehicle axle.

20. The transportation system as specified in claim 18 further comprising a guard located in front of the casters to push objects out of the way so as not to impede the vehicle movement.

21. The transportation system as specified in claim 18 further comprising ingress means overhead monolift having a parallel flanged structure supported from ground level to a selected distance above said vehicle, said parallel flanged structure further having a pair of inner bearing surfaces and a slot in the middle providing continuous support for the casters and space to receive the overhead lifting means therewithin, for guiding the overhead lifting means, with the slot having a angularly widened initial opening engaged guide, said monolift positioned over said road network aligned such that the lifting means enters the parallel flanged structure, said structure having a gradual upward slope above the road transferring vehicle weight from the road wheels to the casters with the caster drive means propelling the vehicle while interfaced with the monolift, said monolift further having a gradual downward slope above the rail network permitting the vehicle to enter the rail network and transfer the vehicle weight to the rail network.

22. The transportation system as specified in claim 18 further comprising egress means overhead monolift having a parallel flanged structure supported from ground level to a selected distance above said vehicle, said parallel flanged structure further having a pair of inner bearing surfaces and a slot in the middle providing continuous support for the casters and space to receive the overhead lifting means therwithin, said monolift positioned over said rail network aligned such that the lifting means enters the parallel flanged structure, said structure having a gradual upward slope above the rail transferring vehicle weight from the rail wheels to the casters with the caster drive means propelling the vehicle while interfaced with the monolift, said monolift further having a gradual downward slope above the road network permitting the vehicle to enter the road network and transfer the vehicle weight to the road.

23. The transportation system as specified in claim 1 further comprising a suspension bridge having ingress means on an end and egress means on the other said bridge having suspension means, attached to a parallel flanged structure with a pair of inner bearing surfaces and a slot in the middle providing continuous support to the overhead lifting means of the vehicle, for spanning a distance where road and rail networks are impractical.

* * * * *